US012609426B2

(12) United States Patent
    Zhao

(10) Patent No.: US 12,609,426 B2
(45) Date of Patent: Apr. 21, 2026

(54) BATTERY CELL PACK AND ASSEMBLY METHOD OF BATTERY CELL PACK

(71) Applicant: CALB Co., Ltd., Jiangsu (CN)

(72) Inventor: Dong Zhao, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 819 days.

(21) Appl. No.: 17/967,903

(22) Filed: Oct. 18, 2022

(65) Prior Publication Data

US 2023/0369732 A1    Nov. 16, 2023

(30) Foreign Application Priority Data

May 16, 2022    (CN) .......................... 202210531212.7

(51) Int. Cl.
    *H01M 50/593* (2021.01)
(52) U.S. Cl.
    CPC ................................ *H01M 50/593* (2021.01)
(58) Field of Classification Search
    CPC ............. H01M 50/593; H01M 50/244; H01M 50/291; H01M 50/209; H01M 10/04; Y02E 60/10
    See application file for complete search history.

(56) References Cited

U.S. PATENT DOCUMENTS 5,502,366 A  *  3/1996  Lee ...................... H01M 50/209
                                                        429/186

FOREIGN PATENT DOCUMENTS

| | | | |
|---|---|---|---|
| CN | 203871383 | | 10/2014 |
| CN | 203871383 | U * | 10/2014 |
| CN | 114374030 | | 4/2022 |
| CN | 217281067 | | 8/2022 |
| DE | 102010006390 | | 8/2011 |
| EP | 3343667 | | 10/2019 |
| WO | 2021057466 | | 4/2021 |

OTHER PUBLICATIONS

English translation of CN203871383U (Year: 2014).*
"Office Action of China Counterpart Application", issued on Jul. 19, 2025, p. 1-p. 10.
"Search Report of Europe Counterpart Application", issued on Aug. 17, 2023, p. 1-p. 6.
"Decision of Rejection of China Counterpart Application", issued on Nov. 27, 2025, with English translation thereof, p. 1-p. 16.
"Examination report of India Counterpart Application", issued on Feb. 27, 2026, p. 1-p. 8.

* cited by examiner

*Primary Examiner* — Ula C Ruddock
*Assistant Examiner* — Sarika Gupta
(74) *Attorney, Agent, or Firm* — JCIP GLOBAL INC.

(57)                    ABSTRACT

A battery cell pack and an assembly method of the battery cell pack are provided. The battery cell pack includes an end plate and at least one cell. The end plate is provided with a limiting protrusion. The cell is provided with a recess. At least part of the limiting protrusion is located in the recess to position the end plate and the cell.

19 Claims, 4 Drawing Sheets

BATTERY CELL PACK AND ASSEMBLY METHOD OF BATTERY CELL PACK

CROSS-REFERENCE TO RELATED APPLICATION

This application claims the priority benefit of China application serial no. 202210531212.7, filed on May 16, 2022. The entirety of the above-mentioned patent application is hereby incorporated by reference herein and made a part of this specification.

BACKGROUND

Technical Field

The disclosure relates to the technical field of cells, and in particular to a battery cell pack and an assembly method of the battery cell pack.

Description of Related Art

In the related art, a battery cell pack may include multiple cells and end plates disposed on the end sides of the cells. The end plates are bonded to the cells. Then, the bonding of the end plates and the cells is prone to inaccurate positioning, thereby affecting the assembly efficiency of the battery cell pack.

SUMMARY

The disclosure provides a battery cell pack and an assembly method of the battery cell pack.

According to a first aspect of the disclosure, a battery cell pack is provided, which includes an end plate and at least one cell. The end plate is provided with a limiting protrusion, the cell is provided with a recess, and at least part of the limiting protrusion is located in the recess to position the end plate and the cell.

According to a second aspect of the disclosure, an assembly method of a battery cell pack is provided, which includes the following.

A limiting protrusion of an end plate is accommodated into a recess of a cell.

Multiple cells are stacked from one side of the cell away from the end plate along a stacking direction. The stacking direction is perpendicular to a large surface of the cell.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DETAILED DESCRIPTION OF DISCLOSED EMBODIMENTS

Figure 1:
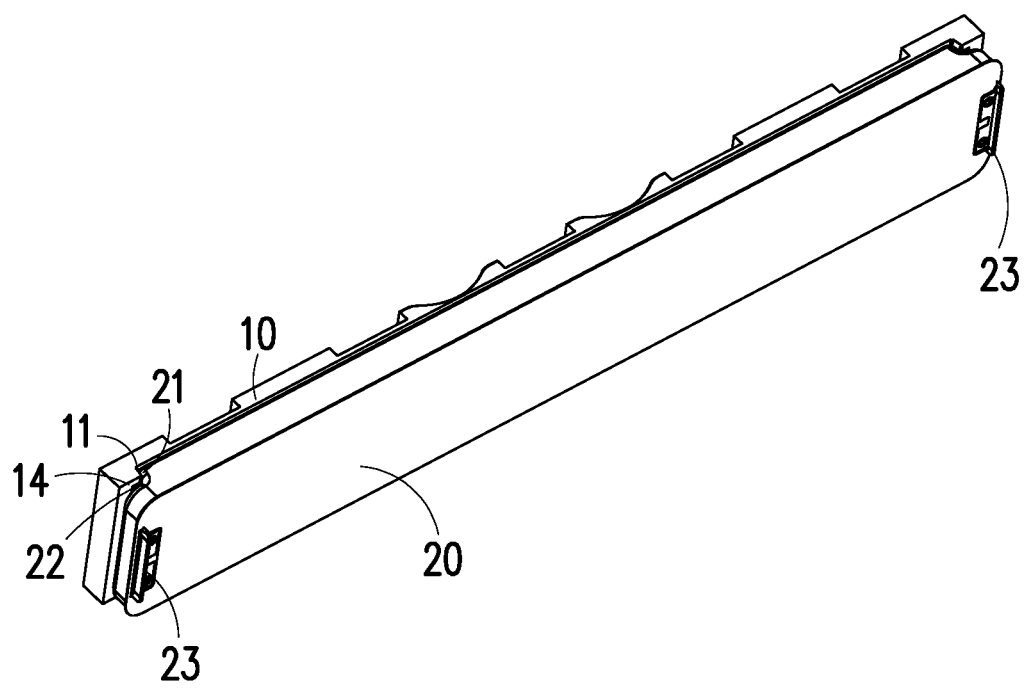
FIG. 1 is a schematic diagram of a partial structure of a battery cell pack according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An embodiment of the disclosure provides a battery cell pack. Please refer to FIG. 1 to FIG. 5. The battery cell pack includes an end plate 10 and at least one cell 20. The end plate 10 is provided with a limiting protrusion 14, the cell 20 is provided with a recess 22, and at least part of the limiting protrusion 14 is located in the recess 22 to position the end plate 10 and the cell 20.

The battery cell pack of an embodiment of the disclosure includes the end plate 10 and the cell 20. Through matching the limiting protrusion 14 of the end plate 10 with the recesses 22 of the cell 20, the positioning of the first cell 20 and the end plate can be quickly and accurately completed, which is convenient for subsequent stacking of other cells 20, thereby improving the assembly efficiency of the battery cell pack, and ensuring the assembly precision of the battery cell pack, so as to improve the usage performance of the battery cell pack.

It should be noted that the battery cell pack includes multiple cells 20, and one of the cells 20 is connected to the end plate 10. During the stacking process of the battery cell pack, one cell 20 may be connected to the end plate 10 first. In the embodiment, the limiting protrusion 14 of the end plate 10 is matched with the recess 22 of the cell 20, so that the positioning connection between the end plate 10 and the cell 20 can be quickly completed. In the related art, the end plate 10 and the cell 20 are directly attached surface to surface. Due to the structural limitations of the end plate 10 and the cell 20, the positioning of the end plate 10 and the cell 20 is more difficult, the risk of misalignment between the end plate 10 and the cell 20 is higher, and refurbishment is required in most cases, thereby affecting the assembly efficiency of the battery cell pack.

The limiting protrusion 14 of the end plate 10 is matched with the recess 22 of the cell 20, and the limiting protrusion 14 may be adapted to the recess 22. At this time, after the limiting protrusion 14 is matched with the recess 22, the positioning connection between the end plate 10 and the cell 20 may be precisely implemented. Alternatively, the limiting protrusion 14 may not be adapted to the recess 22. For example, the size of the recess 22 may be greater than that of the limiting protrusion 14, but since the end plate 10 and the cell 20 may be fundamentally positioned between the limiting protrusion 14 and the recess 22, compared with the use of direct attachment surface to surface, such positioning manner also has higher accuracy and more convenient operation.

In an embodiment, the end plate 10 and the cell 20 are engaged, so that the positioning of the first cell 20 and the end plate 10 can be quickly and accurately completed, so as to facilitate subsequent stacking of other cells 20, thereby improving the assembly efficiency of the battery cell pack, and ensuring the assembly precision of the battery cell pack.

The end plate 10 and the cell 20 may be engaged through the limiting protrusion 14 and the recess 22 or the end plate 10 and the cell 20 may be engaged through other structures.

After engaging the end plate 10 and the cell 20, the stacking of other cells 20 is relatively simple. After all, the structures of the cells 20 are basically the same, and the positioning is less difficult, thereby ensuring the assembly efficiency of the battery cell pack.

In an embodiment, the end plate 10 and the cell 20 are engaged, the end plate 10 may be provided with a first engaging portion, the cell 20 may be provided with a second engaging portion, and the first engaging portion and the second engaging portion are engaged, thereby implementing the positioning connection between the end plate 10 and the cell 20. For example, the first engaging portion may be a groove, and the second engaging portion may be a protrusion, and the groove is matched with the protrusion to implement the engagement of the end plate 10 and the cell 20. The groove may be a rectangular groove, and the protrusion may be a rectangular protrusion, so that the positioning connection between the end plate 10 and the cell 20 can be ensured after the groove is matched with the protrusion. Alternatively, the groove may be a circular groove, and the protrusion may be a cylindrical protrusion. At this time, there may be at least two protrusions and grooves, so that the positioning connection between the end plate 10 and the cell 20 can be ensured after the grooves are matched with the protrusions. The first engaging portion and the second engaging portion may also be the matching of hooks, so as to ensure that the end plate 10 and the cell 20 can be quickly engaged and positioned.

It should be noted that the end plate 10 and the cell 20 may be engaged by specially forming the first engaging portion and the second engaging portion on the end plate 10 and the cell 20 for engagement. For example, the protrusion may be punched out on the casing of the cell 20, and the groove may be punched out on the end plate 10.

In an embodiment, the end plate 10 is provided with a positioning slot 11, and the cell 20 is engaged into the positioning slot 11, so that the end plate 10 and the cell 20 can be quickly positioned, so as to improve the assembly efficiency of the battery cell pack, and ensure the accuracy of the assembly positions of the end plate 10 and the cell 20.

The end plate 10 may be a generally rectangular structure, and the cell 20 may be a prismatic cell. The positioning slot 11 of the end plate 10 may extend along a length direction of the end plate 10, and two outer surfaces of the cell 20 in a length direction may be engaged into the positioning slot 11. Alternatively, the positioning slot 11 of the end plate 10 may extend along a width direction of the end plate 10, and two outer surfaces of the cell 20 in a width direction may be engaged into the positioning slot 11.

In an embodiment, as shown in FIG. 1, the cell 20 is formed with a protruding portion 21. The protruding portion 21 is engaged into the positioning slot 11, so that the end plate 10 and the cell 20 can be quickly positioned, so as to improve the assembly efficiency of the battery cell pack, and ensure the connection stability of the end plate 10 and the cell 20.

Figure 4:
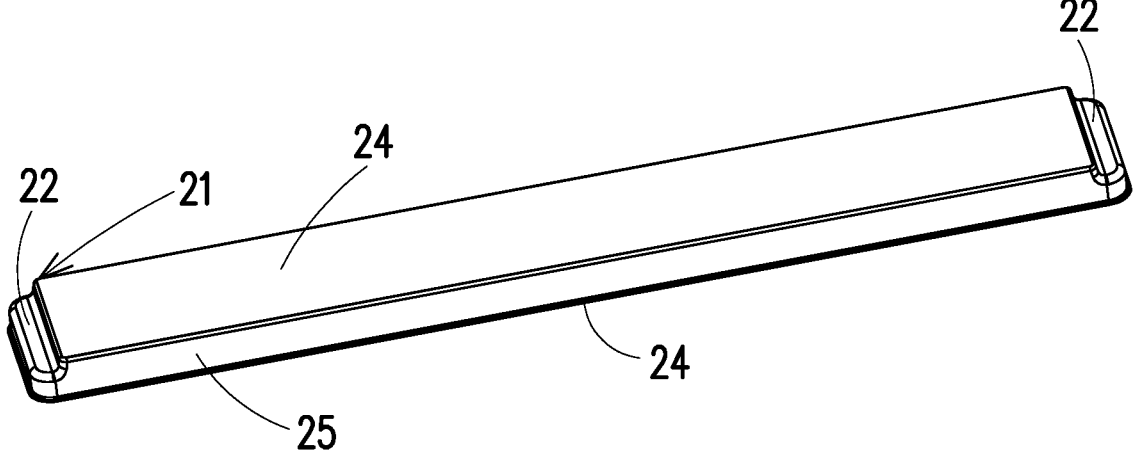
FIG. 4 is a schematic diagram of a structure of a cell of a battery cell pack according to an exemplary embodiment.

In an embodiment, as shown in FIG. 4, the cell 20 is provided with the recess 22 to form a protruding portion 21, that is, the protruding portion 21 forms at least part of a side wall of the recess 22, so that the protruding portion 21 can be engaged into the positioning slot 11, so as to ensure the positioning connection between the end plate 10 and the cell 20.

Figure 2:
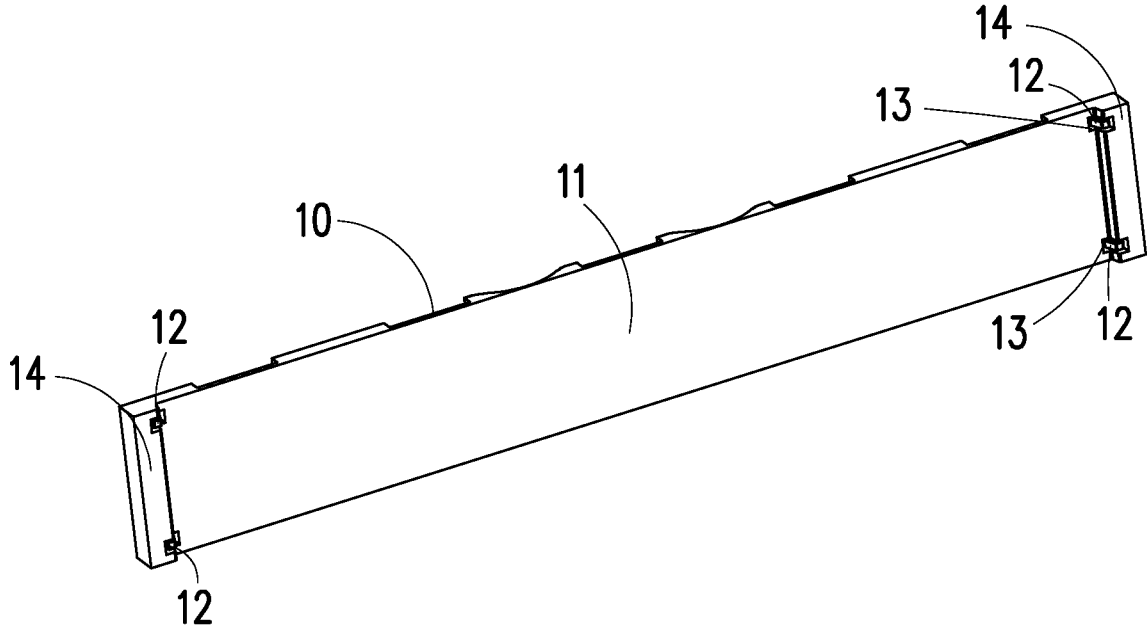
FIG. 2 is a schematic diagram of a structure of an end plate of a battery cell pack according to an exemplary embodiment.

Correspondingly, as shown in FIG. 2, the end plate 10 is provided with the positioning slot 11 to form the limiting protrusion 14, that is, the limiting protrusion 14 forms at least part of a side wall of the positioning slot 11.

In an embodiment, as shown in FIG. 2 and FIG. 4, the recess 22 is located at an end portion of the cell 20, and the recess 22 intersects three circumferential outer surfaces of the cell 20. There are two recesses 22, the protruding portion 21 is located between the two recesses 22, there are two limiting protrusions 14, and the positioning slot 11 is located between the two limiting protrusions 14, so that the protruding portion 21 can be engaged into the positioning slot 11, and a bottom surface of the recess 22 of the cell 20 can be disposed opposite to the end plate 10, so as to ensure the reliable positioning of the end plate 10 and the cell 20, and also implement the reliable protection of the cell 20 by the end plate 10.

The recess 22 intersects the three circumferential outer surfaces of the cell 20, that is, the recess 22 may only include one bottom surface and one side surface, and the side surface of the recess 22 may be located in the positioning slot 11, so that the protruding portion 21 can be securely engaged into the positioning slot 11.

In an embodiment, the cell 20 includes a pole assembly 23. The pole assembly 23 protrudes from an outer surface of the cell 20.

In some embodiments, the pole assembly 23 may be disposed in the recess 22, so that the space of the cell 20 can be utilized to the maximum extent. The pole assembly 23 may be spaced apart from the end plate 10. For example, the end plate 10 may be provided with a space for avoiding the pole assembly 23 or the pole assembly 23 may be lower than the recess 22. Even if the protruding portion 21 is located in the positioning slot 11, the pole assembly 23 will not come into contact with the end plate 10.

In some embodiments, as shown in FIG. 1 and FIG. 4, the recess 22 and the pole assembly 23 are respectively located on two opposite surfaces of the cell 20, that is, the pole assembly 23 may be disposed on the outer surface of the cell 20 away from the recess 22, thereby preventing contact between the pole assembly 23 and the end plate 10, and the pole assembly 23 on the cell 20 may be located in the recess 22 of another cell 20 to implement the avoidance, thereby ensuring the stacking of the battery cell pack to the maximum extent.

At least part of the pole assembly 23 is located in the recess 22 of the adjacent cell 20, which can not only prevent contact between the pole assembly 23 and the end plate 10, and improve the space utilization rate of the battery cell pack, but the matching of the pole assembly 23 and the recess 22 also ensures the positioning between the adjacent cells 20, that is, the matching of the pole assembly 23 and the recess 22 may form quick positioning between the cells 20, thereby ensuring the positioning precision between the cells 20.

Since the stacking between the cells 20 can ensure relatively high positioning precision, the positioning between the end plate 10 and the first cell 20 is particularly important. If there is a large deviation in the positioning between the end plate 10 and the first cell 20, there will be an overall deviation in the assembly of the entire battery cell pack. After all, the positioning between the cells 20 is relatively accurate. Therefore, in the embodiment, at least part of the limiting protrusion 14 is located in the recess 22 to position the end plate 10 and the cell 20, thereby ensuring the overall positioning precision of the battery cell pack.

In an embodiment, as shown in FIG. 1 and FIG. 4, there are two pole assemblies 23 and two recesses 22. The recess 22 and the pole assembly 23 are both located at the end portion of the cell 20. The two recesses 22 are disposed at intervals along the length direction of the cell 20, and the two pole assemblies 23 are disposed at intervals along the length direction of the cell 20, so that the two pole assemblies 23 are respectively accommodated into the recess 22 of another cell 20, so as to ensure the positioning precision between the cells 20, and ensure the space utilization rate of the battery cell pack.

In an embodiment, as shown in FIG. 4, the cell 20 includes two opposite first surfaces 24 and four second surfaces 25 disposed surrounding the first surfaces 24. An area of the first surface 24 is greater than an area of the second surface 25. The recess 22 is disposed on one of the first surfaces 24, so that the large surface of the cell 20 may be disposed opposite to the end plate 10, and the stacking of the adjacent cells 20 are also formed by the large surfaces.

The cell 20 includes two opposite first surfaces 24 and four second surfaces 25 disposed surrounding the first surfaces 24. The recess 22 is disposed on the first surface 24, which may be considered to form a space at the end portion of the cell 20. One side of the cell 20 facing the end plate 10 is the first surface 24, and the protruding portion 21 actually forms the first surface 24.

For the two opposite first surfaces 24 of the cell 20, a part of one of the first surfaces 24 forms the recess 22, and the pole assembly 23 may be disposed on the other one of the first surfaces 24. The first surface 24 may provide a reliable supporting surface for the pole assembly 23, so as to ensure the stability of the pole assembly 23.

There are two pole assemblies 23. The two pole assemblies 23 are both disposed on the same first surface 24, and the two pole assemblies 23 are respectively located at two ends of the first surface 24. Correspondingly, the first surface 24 may be formed with two recesses 22.

It should be noted that the two opposite first surfaces 24 are the large surfaces of the cell 20, and the four second surfaces 25 are small surfaces of the cell 20. The four second surfaces 25 include two pairs of small surfaces, that is, a first pair of small surfaces extending along the length direction of the cell 20 and a second pair of small surfaces extending along the width direction of the cell 20, and an area of the first pair of small surfaces is greater than an area of the second pair of small surfaces, but both are smaller than an area of the large surface.

In an embodiment, orthographic projections of the pole assembly 23 and the recess 22 on the same first surface 24 at least partially coincide, so that among the two adjacent cells 20, the recess 22 of one of the cells 20 can be used to accommodate the pole assembly 23 of the other one of the cells 20.

It should be noted that an area of a surface of the protruding portion 21 facing the end plate 10 is greater than an area of a surface of the recess 22 facing the end plate 10, that is, an area of the bottom surface of the recess 22 is smaller than an area of the surface of the protruding portion 21 facing the end plate 10. Further, the sum of the areas of the bottom surfaces of the two recesses 22 is also smaller than the area of the surface of the protruding portion 21 facing the end plate 10. The area of the bottom surface of the recess 22 is not greater than one tenth of the area of the surface of the protruding portion 21 facing the end plate 10.

In some embodiments, it is not excluded that the recess 22 may be located at a middle portion of the cell 20. For example, the cell 20 may include two cores. The two cores may be arranged along the length direction of the cell 20. At this time, the recess 22 may be located between the two cores, that is, the recess 22 may be located at the middle portion of the cell 20. At this time, the recess 22 may still be used to be matched with the limiting protrusion 14 of the end plate 10, and the pole assembly 23 of the cell 20 may still be accommodated into the recess 22 of another cell 20.

Figure 3:
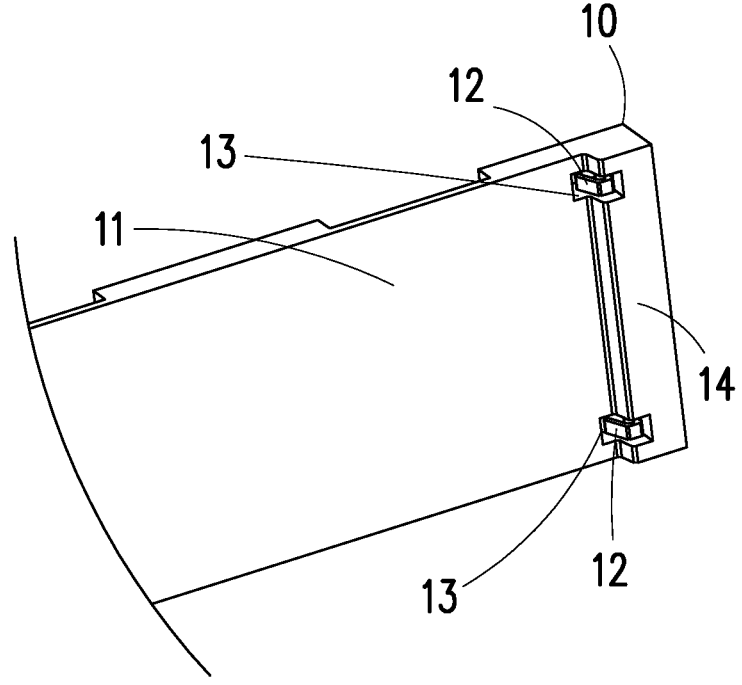
FIG. 3 is a schematic diagram of a partial structure of an end plate of a battery cell pack according to an exemplary embodiment.

In an embodiment, as shown in FIG. 1 to FIG. 3, the end plate 10 is provided with an engaging portion 12. The engaging portion 12 abuts against a part of the cell 20 engaged into the positioning slot 11, so that the cell 20 can be reliably fixed in the positioning slot 11, so as to ensure the installation stability of the cell 20.

The protruding portion 21 of the cell 20 may be located in the positioning slot 11, and the engaging portion 12 may abut against the protruding portion 21, so that the cell 20 may be reliably fixed in the positioning slot 11, which can improve the connection stability of the cell 20 and the end plate 10 on the basis of facilitating the reliable positioning of the cell 20 and the end plate 10.

In an embodiment, the engaging portion 12 includes an elastic member, so that after the cell 20 is released from the positioning slot 11, a part of the engaging portion 12 is located in the positioning slot 11, that is, when the cell 20 is installed in the positioning slot 11, the cell 20 may squeeze the engaging portion 12. The engaging portion 12 can not only implement the fixing of the cell 20, but also ensure that the cell 20 is fixed at a reliable position. On the basis of positioning the cell 20 by the positioning slot 11, the engaging portion 12 serves as a structure for automatically correcting the position offset of the cell 20.

In an embodiment, the engaging portion 12 is a hook, so that when the cell 20 is installed in the positioning slot 11, the engaging portion 12 drives the cell 20 to be installed at a predetermined position, that is, the engaging portion 12 serves as the structure for automatically correcting the position offset of the cell 20, thereby ensuring that the cell 20 is installed at a relatively fixed position without large offset, so as to improve the positioning precision of the cell 20 and the end plate 10.

When the protruding portion 21 of the cell 20 is installed in the positioning slot 11, the protruding portion 21 may squeeze the engaging portion 12. During the process, the engaging portion 12 may serve as a guiding structure for the protruding portion 21, thereby facilitating the installation of the protruding portion 21 in the positioning slot 11. Also, after the protruding portion 21 is installed and positioned, the engaging portion 12 may restore the structure under the action of the elastic force, so as to drive the cell 20 to adjust the position in the positioning slot 11, thereby ensuring that the cell 20 is installed at the predetermined position.

In an embodiment, the engaging portion 12 is a hook, the engaging portion 12 forms a cantilever structure. The cantilever structure is bent from one side away from the cell 20, thereby forming the hook. At this time, the hook may serve as the protruding portion 21 to be installed in the positioning structure in the positioning slot 11. The engaging portion 12 may be a substantially L-shaped structure, which is not only simple in structure, but also can guide and fix the protruding portion 21.

In an embodiment, as shown in FIG. 3, the end plate 10 is provided with an avoiding space 13. The avoiding space 13 is communicated with the positioning slot 11, and at least part of the engaging portion 12 is located in the avoiding space 13, so that the engaging portion 12 can be elastically deformed in the avoiding space 13, so as to reliably contact the cell 20 to improve the installation stability of the cell 20.

In an embodiment, the engaging portion 12 is disposed at a position corner of the end plate 10 close to the positioning slot 11, which is not only convenient to manufacture, but also does not affect the installation of the cell 20. Further, the avoiding space 13 is disposed at the corner position of the end plate 10 close to the positioning slot 11, and a part of the avoiding space 13 is located in the positioning slot 11.

In an embodiment, the avoiding space 13 is a through hole, so that the engaging portion 12 can be reliably deformed, and the arrangement of the through hole is relatively simple, which also facilitates the arrangement of the engaging portion 12.

In an embodiment, there are at least two engaging portions 12. The at least two engaging portions 12 are symmetrically disposed on a periphery of the positioning slot 11, which can not only reliably engage the cell 20, but also ensure structural stability.

The at least two engaging portions 12 are symmetrically disposed on the periphery of the positioning slot 11, that is, the at least two engaging portions 12 may be axially symmetrical. Alternatively, the at least two engaging portions 12 may be centrally symmetrical.

In an embodiment, the engaging portions 12 are disposed in pairs. The cell 20 is located between the paired engaging portions 12, so that the cell 20 can be reliably engaged between the paired engaging portions 12, which ensures the stability of the cell 20, and the paired engaging portions 12 can also ensure that the cell 20 is reliably positioned at the predetermined position.

As shown in FIG. 2 and FIG. 3, there may be two pairs of the engaging portions 12. The four engaging portions 12 may be respectively disposed at the four corner positions of the end plate 10 close to the positioning slot 11, so that the cell 20 may be reliably positioned in the positioning slot 11.

In an embodiment, the positioning slot 11 may be a gradually expanding structure, that is, the positioning slot 11 may gradually increase from a bottom wall to an opening thereof, so as to facilitate the installation of the cell 20 in the positioning slot 11. The side wall of the positioning slot 11 is inclined to the bottom wall of the positioning slot 11 to form the gradually expanding structure.

In some embodiments, the side wall of the positioning slot 11 may be basically perpendicular to the bottom wall of the positioning slot 11.

In an embodiment, the end plate 10 includes an insulating portion. The insulating portion is disposed toward the cell 20, so that reliable insulation can be formed between the end plate 10 and the cell 20.

The end plate 10 may be an insulating plate or a part of the end plate 10 may be an insulating plate, which is not limited herein. The end plate 10 may be provided with an insulating layer. The insulating layer may be a coating layer, such as a coating layer prepared from a ceramic material such as aluminum oxide ($Al_2O_3$) and zirconium dioxide ($ZrO_2$).

In an embodiment, there are at least two cells 20. The adjacent cells 20 are engaged, which not only improves the connection strength between the cells 20, but also improves the positioning precision between the cells 20.

One side of the cell 20 is formed with the protruding portion 21, and the other side of the cell 20 may be formed with a groove, so that the protruding portion 21 may be matched with the groove in the adjacent cells 20, thereby improving the positioning precision between the cells 20.

The adjacent cells 20 may be engaged through the pole assembly 23 and the recess, but it is necessary to ensure that the part of the pole assembly 23 of one cell 20 in contact with the other cell is insulated.

In an embodiment, there are at least two cells 20. The adjacent cells 20 are bonded, that is, the large surfaces of the cells 20 may be directly bonded. After quickly and accurately completing the positioning the first cell 20 and the end plate 10, other cells 20 may be quickly stacked subsequently.

Figure 5:
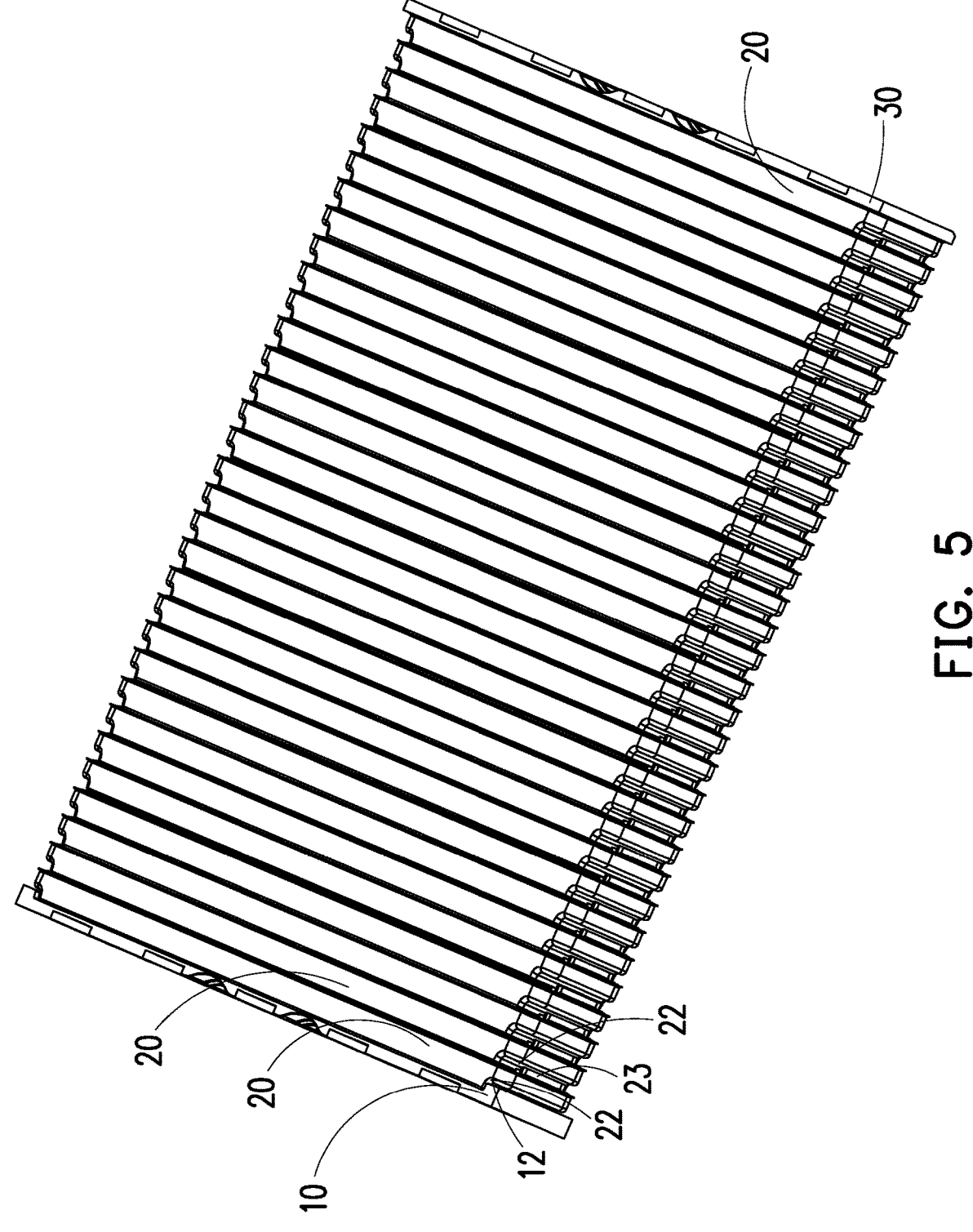
FIG. 5 is a schematic diagram of a structure of a battery cell pack according to an exemplary embodiment.

In an embodiment, as shown in FIG. 5, the battery cell pack includes the cells 20, the end plate 10, and a stop plate 30. The cells 20 are located between the end plate 10 and the stop plate 30. The stop plate 30 may be a flat plate, that is, the stop plate 30 may be attached to the large surface of the cell 20 or the stop plate 30 may be positioned and matched with the cell 20. For example, the groove is formed on one side of the cell 20 facing the stop plate 30, and the stop plate 30 may be provided with a protrusion, so as to position and match the stop plate 30 and the cell 20.

The cell 20 may include a core and an electrolyte, and is the smallest unit capable of performing electrochemical reactions such as charging/discharging. The core refers to a unit formed by winding or laminating a stack portion. The stack portion includes a first electrode, a separator, and a second electrode. When the first electrode is a positive electrode, the second electrode is a negative electrode. The polarities of the first electrode and the second electrode may be interchanged.

The cell is a laminated cell, which is not only convenient for grouping, but may also be processed to obtain a cell with a longer length.

Specifically, the core is a laminated core. The core has a first pole piece, a second pole piece electrically opposite to the first pole piece, and a diaphragm piece disposed between the first pole piece and the second pole piece that are stacked on each other, so that multiple pairs of first pole pieces and second pole pieces are stacked to form the laminated core.

Optionally, the cell 20 may be a wound cell, that is, the first pole piece, the second pole piece electrically opposite to the first pole piece, and the diaphragm piece disposed between the first pole piece and the second pole piece are wound to obtain the wound core.

In an embodiment, the battery cell pack is a cell module or a battery cell pack.

The cell module includes the cells 20, and the cell module may fix the cells 20 through the end plate 10 and the stop plate 30. Further, the cell module may also include two opposite side plates. The end plate 10, the stop plate 30, and the side plates are used to fix the cells 20. A buffer structure may be disposed between some of the cells 20. The cells 20 may be connected in series or in parallel through a bus bar.

The battery cell pack may include a cell box. The cells 20 may be disposed in the cell box after forming a cell module. Alternatively, the end plate 10 and the cell 20 may be directly stacked in the cell box, that is, without forming the cell module first.

Figure 6:
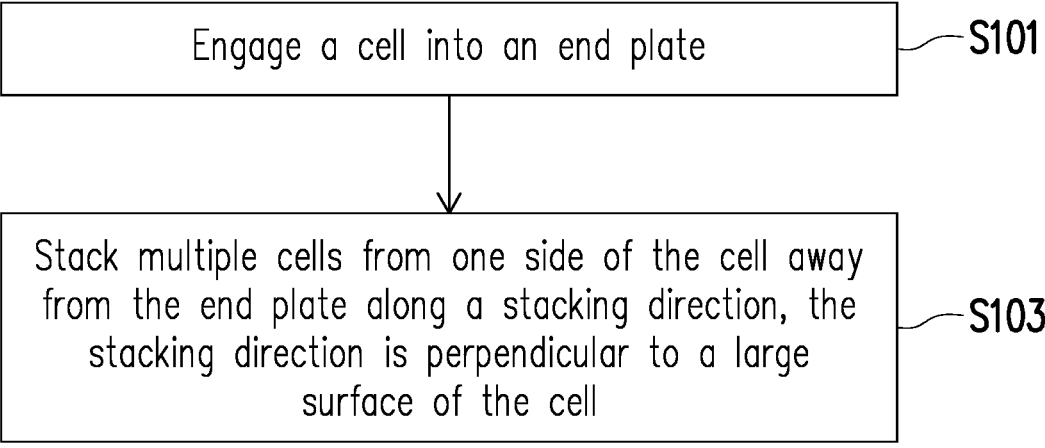
FIG. 6 is a schematic flowchart of an assembly method of a battery cell pack according to an exemplary embodiment.

An embodiment of the disclosure also provides an assembly method of a battery cell pack. Please refer to FIG. 6. The assembly method of the battery cell pack includes the following.

In S101, a cell 20 is engaged into an end plate 10.

In S103, multiple cells 20 are stacked from one side of the cell 20 away from the end plate 10 along a stacking direction. The stacking direction is perpendicular to a large surface of the cell 20.

In the assembly method of the battery cell pack of an embodiment of the disclosure, through engaging the end plate 10 and the cell 20, the positioning of the first cell 20 and the end plate 10 can be quickly and accurately completed. The cells 20 are subsequently stacked from one side of the cell 20 away from the end plate 10, so as to implement the stacking of the cells 20. Since the end plate 10 and the cell 20 are reliably positioned, the subsequent stacking of other cells 20 can be facilitated to improve the assembly efficiency of the battery cell pack, and ensure the assembly precision of the battery cell pack.

It should be noted that the cells 20 are stacked from one side of the cell 20 away from the end plate 10 along the stacking direction inside the cell box or the cells 20 are stacked from one side of the cell 20 away from the end plate 10 along the stacking direction outside the cell box.

The large surfaces of the cell are the two opposite first surfaces 24 of the cell 20. The cells 20 are in contact with each other by the large surfaces, thereby ensuring the stacking quality between the cells 20, so as to improve the stacking efficiency of the battery cell pack.

In an embodiment, engaging the cell 20 into the end plate 10 includes engaging the protruding portion 21 of the cell 20 into the positioning slot 11 of the end plate 10, so that the end plate 10 and the cell 20 can be quickly positioned, so as to improve the assembly efficiency of the battery cell pack, and ensure the accuracy of the assembly positions of the end plate 10 and the cell 20.

During the specific stacking process, the protruding portion 21 of the cell 20 is aligned with the positioning slot 11 of the end plate 10, thereby snapping the protruding portion 21 into the positioning slot 11, so that the end plate 10 and the cell 20 can be quickly positioned.

The end plate 10 may be installed in the cell box first, the cell 20 is then placed into the cell box, and the cell 20 is pushed into the end plate 10, so that the end plate 10 and the cell 20 can be quickly positioned. Then, other cells 20 are sequentially stacked in the cell box.

Alternatively, the end plate 10 and the cell 20 may be positioned and connected outside the cell box, and the end plate 10 and the cell 20 are then placed into the cell box. Then, other cells 20 are sequentially stacked in the cell box.

Alternatively, the end plate 10 and the cell 20 may be positioned and connected outside the cell box. Then, other cells 20 are sequentially stacked outside the cell box. The cells 20 are placed into the cell box after being stacked.

In an embodiment, engaging the cell 20 into the end plate 10 includes engaging the protruding portion 21 of the cell 20 between the engaging portion 12 of the end plate 10. The engaging portion 12 can not only fix the cell 20, but also ensure that the cell 20 is fixed at a reliable position. On the basis of positioning the cell 20 by the positioning slot 11, the engaging portion 12 serves as the structure for automatically correcting the position offset of the cell 20.

In an embodiment, stacking the cells 20 from one side of the cell 20 away from the end plate 10 along the stacking direction includes engaging the adjacent cells 20, which can not only improve the connection strength between the cells 20, but also improve the positioning precision between the cells 20, so as to improve the assembly efficiency of the battery cell pack.

In an embodiment, stacking the cells 20 from one side of the cell 20 away from the end plate 10 along the stacking direction includes bonding the adjacent cells 20, that is, bonding the large surfaces between the cells 20.

In an embodiment, the assembly method of the battery cell pack further includes disposing the stop plate 30 on one side of the cell 20, thereby clamping the cells 20 between the end plate 10 and the stop plate 30.

In an embodiment, the assembly method of the battery cell pack further includes forming a pre-tightening force between the cells 20 through squeezing the stop plate 30.

In an embodiment, the assembly method of the battery cell pack further includes disposing the buffer structure between some of the cells 20.

In an embodiment, the assembly method of the battery cell pack further includes electrically connecting the adjacent cells 20 through the bus bar.

In an embodiment, the assembly method of the battery cell pack is used to form the battery cell pack.

Figure 7:
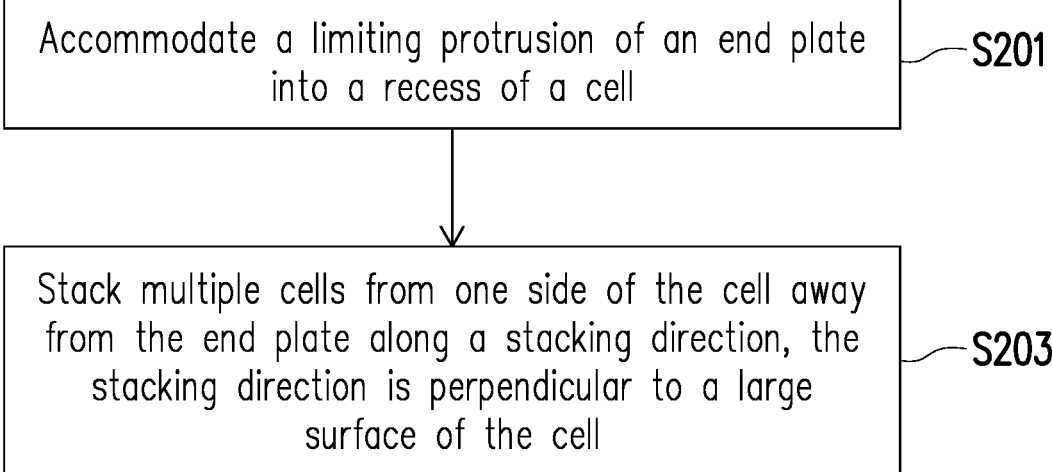
FIG. 7 is a schematic flowchart of an assembly method of a battery cell pack according to another exemplary embodiment.

An embodiment of the disclosure also provides an assembly method of a battery cell pack. Please refer to FIG. 7. The assembly method of the battery cell pack includes the following.

In S201, a limiting protrusion 14 of an end plate 10 is accommodated into a recess 22 of a cell 20.

In S203, multiple cells 20 are stacked from one side of the cell 20 away from the end plate 10 along a stacking direction. The stacking direction is perpendicular to a large surface of the cell 20.

The assembly method of the battery cell pack of an embodiment of the disclosure accommodates the limiting protrusion 14 of the end plate 10 into the recess 22 of the cell 20, so that the positioning of the first cell 20 and the end plate 10 can be quickly and accurately completed.

Subsequently, the cells 20 may be stacked on one side of the cell 20 away from the end plate 10, so as to implement the stacking of the cells 20. Since the end plate 10 and the cell 20 are reliably positioned, the subsequent stacking of other cells can be facilitated to improve the assembly efficiency of the battery cell pack, and ensure the assembly precision of the battery cell pack.

It should be noted that the cells 20 are stacked from one side of the cell 20 away from the end plate 10 along the stacking direction inside the cell box or the cells 20 are stacked from one side of the cell 20 away from the end plate 10 along the stacking direction outside the cell box.

The large surfaces of the cell are the two opposite first surfaces 24 of the cell 20. The cells 20 are in contact with each other by the large surfaces, thereby ensuring the stacking quality between the cells 20, so as to improve the stacking efficiency of the battery cell pack.

In an embodiment, stacking the cells 20 from one side of the cell 20 away from the end plate 10 along the stacking direction includes accommodating the pole assembly 23 of one of the adjacent cells 20 into the recess 22 of the other cell 20, which can not only prevent contact between the pole assembly 23 and the end plate 10, and improve the space utilization rate of the battery cell pack, but the matching of the pole assembly 23 and the recess 22 also ensures the positioning between the adjacent cells 20, that is, the matching of the pole assembly 23 and the recess 22 may form quick positioning between the cells 20, thereby ensuring the positioning precision between the cells 20.

In an embodiment, stacking the cells 20 from one side of the cell 20 away from the end plate 10 along the stacking direction includes engaging the adjacent cells 20, which can not only improve the connection strength between the cells 20, but also improve the positioning precision between the cells 20, so as to improve the assembly efficiency of the battery cell pack.

In an embodiment, the limiting protrusion 14 of the end plate 10 is accommodated into the recess 22 of the cell 20, so that the cell 20 is engaged into the end plate 10, which can not only ensure that the end plate 10 and the cell 20 are quickly positioned, but also ensure the connection stability of the end plate 10 and the cell 20.

In an embodiment, engaging the cell 20 into the end plate 10 includes engaging the protruding portion 21 of the cell 20 into the positioning slot 11 of the end plate 10, so that the end plate 10 and the cell 20 can be quickly positioned, so as to improve the assembly efficiency of the battery cell pack, and ensure the accuracy of the assembly positions of the end plate 10 and the cell 20.

During the specific stacking process, the protruding portion 21 of the cell 20 is aligned with the positioning slot 11 of the end plate 10, so that the protruding portion 21 is engaged into the positioning slot 11, so that the end plate 10 and the cell 20 are quickly positioned.

The end plate 10 may be installed in the cell box first, the cell 20 is then placed into the cell box, and the cell 20 is pushed into the end plate 10, so that the end plate 10 and the cell 20 can be quickly positioned. Then, other cells 20 are sequentially stacked in the cell box.

Alternatively, the end plate 10 and the cell 20 may be positioned and connected outside the cell box, and the end plate 10 and the cell 20 are then placed into the cell box. Then, other cells 20 are sequentially stacked in the cell box.

Alternatively, the end plate 10 and the cell 20 may be positioned and connected outside the cell box. Then, other cells 20 are sequentially stacked outside the cell box. The cells 20 are placed into the cell box after being stacked.

In an embodiment, engaging the cell 20 into the end plate 10 includes engaging the protruding portion 21 of the cell 20 between the engaging portion 12 of the end plate 10. The engaging portion 12 can not only fix the cell 20, but also ensure that the cell 20 is fixed at a reliable position. On the basis of positioning the cell 20 by the positioning slot 11, the engaging portion 12 serves as the structure for automatically correcting the position offset of the cell 20.

In an embodiment, stacking the cells 20 from one side of the cell 20 away from the end plate 10 along the stacking direction includes bonding the adjacent cells 20, that is, bonding the large surfaces between the cells 20.

In an embodiment, the assembly method of the battery cell pack further includes disposing the stop plate 30 on one side of the cell 20, thereby clamping the cells 20 between the end plate 10 and the stop plate 30.

In an embodiment, the assembly method of the battery cell pack further includes forming a pre-tightening force between the cells 20 through squeezing the stop plate 30.

In an embodiment, the assembly method of the battery cell pack further includes disposing the buffer structure between some of the cells 20.

In an embodiment, the assembly method of the battery cell pack further includes electrically connecting the adjacent cells 20 through the bus bar.

In an embodiment, the assembly method of the battery cell pack is used to form the battery cell pack.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery cell pack, comprising an end plate and at least one cell, wherein the end plate is provided with a limiting protrusion, the cell is provided with a recess, and at least part of the limiting protrusion is located in the recess to position the end plate and the cell, wherein the cell is provided with a pole assembly, the pole assembly protrudes from an outer surface of the cell, and the recess and the pole assembly are respectively located on two opposite surfaces of the cell, wherein at least part of the pole assembly is located in the recess of adjacent cell.

2. The battery cell pack according to claim 1, wherein a number of the pole assembly is two and a number of the recess is two, wherein the recess and the pole assembly are both located at an end portion of the cell, the two recesses are disposed at intervals along a length direction of the cell, and the two pole assemblies are disposed at intervals along the length direction of the cell.

3. The battery cell pack according to claim 1, wherein the end plate is provided with a positioning slot, and the cell is engaged into the positioning slot.

4. The battery cell pack according to claim 3, wherein the cell is formed with a protruding portion, and the protruding portion is engaged into the positioning slot.

5. The battery cell pack according to claim 4, wherein the protruding portion forms at least part of a side wall of the recess, and the limiting protrusion forms at least part of a side wall of the positioning slot.

6. The battery cell pack according to claim 5, wherein the recess is located at an end portion of the cell, and the recess intersects three circumferential outer surfaces of the cell, wherein a number of the recess is two, the protruding portion is located between the two recesses, a number of the limiting protrusion is two, and the positioning slot is located between the two limiting protrusions.

7. The battery cell pack according to claim 3, wherein the end plate is provided with an engaging portion, and the engaging portion abuts against a part of the cell engaged into the positioning slot.

8. The battery cell pack according to claim 7, wherein the engaging portion comprises an elastic member, so that after the cell is released from the positioning slot, a part of the engaging portion is located in the positioning slot.

9. The battery cell pack according to claim 8, wherein the engaging portion is a snap hook, so that when the cell is installed in the positioning slot, the engaging portion drives the cell to be installed at a predetermined position.

10. The battery cell pack according to claim 7, wherein the end plate is provided with an avoiding space, the avoiding space is communicated with the positioning slot, and at least part of the engaging portion is located in the avoiding space.

11. The battery cell pack according to claim 7, wherein a number of the engaging portion is at least two, and the at least two engaging portions are symmetrically disposed on a periphery of the positioning slot.

12. The battery cell pack according to claim 1, wherein the cell comprises two opposite first surfaces and four second surfaces disposed surrounding the first surfaces, and an area of the first surface is greater than an area of the second surface, wherein the recess is disposed on one of the first surfaces.

13. The battery cell pack according to claim 1, wherein the end plate comprises an insulating portion, and the insulating portion is disposed toward the cell.

14. The battery cell pack according to claim 1, wherein adjacent cells are engaged.

15. An assembly method of a battery cell pack, comprising:

accommodating a limiting protrusion of an end plate into a recess of a cell;

stacking a plurality of cells from one side of the cell away from the end plate along a stacking direction, wherein the stacking direction is perpendicular to a large surface of the cell, wherein stacking the cells from one side of the cell away from the end plate along the stacking direction comprises:

accommodating a pole assembly of one of adjacent cells into the recess of other one of the cells.

16. The assembly method of the battery cell pack according to claim 15, wherein stacking the cells from one side of the cell away from the end plate along the stacking direction comprises:

engaging adjacent cells.

17. The assembly method of the battery cell pack according to claim 15, wherein a limiting protrusion of the end plate is accommodated into the recess of the cell, so that the cell is engaged into the end plate.

18. The assembly method of the battery cell pack according to claim 17, wherein engaging the cell into the end plate comprises:

engaging a protruding portion of the cell into a positioning slot of the end plate.

19. The assembly method of the battery cell pack according to claim 17, wherein engaging the cell into the end plate comprises:

engaging a protruding portion of the cell between an engaging portion of the end plate.

\* \* \* \* \*